US005574740A

United States Patent [19]
Hargis et al.

[11] Patent Number: 5,574,740
[45] Date of Patent: Nov. 12, 1996

[54] DEEP BLUE MICROLASER

[75] Inventors: David E. Hargis, La Jolla; Sven E. Nelte, Carlsbad, both of Calif.

[73] Assignee: Laser Power Corporation, San Diego, Calif.

[21] Appl. No.: 295,006

[22] Filed: Aug. 23, 1994

Related U.S. Application Data

[63] Continuation-in-part of Ser. No. 112,558, Aug. 26, 1993, abandoned.

[51] Int. Cl.$^6$ ........................................................ H01S 3/16
[52] U.S. Cl. ............................... 372/41; 372/92; 372/98; 372/66; 372/99; 372/21; 372/22; 372/36; 372/108
[58] Field of Search .................................. 372/92, 18, 22, 372/98, 99, 107, 108, 66, 75, 21, 97, 69

[56] References Cited

U.S. PATENT DOCUMENTS

| | | | |
|---|---|---|---|
| 4,731,787 | 3/1988 | Fan et al. | 372/22 |
| 4,739,507 | 4/1988 | Byer et al. | 372/22 |
| 4,791,631 | 12/1988 | Baumert et al. | 372/22 |
| 4,797,893 | 1/1989 | Dixon | 372/66 |
| 4,809,291 | 2/1989 | Byer et al. | 372/75 |
| 4,847,851 | 7/1989 | Dixon | 372/75 |
| 4,860,304 | 8/1989 | Mooradian | 372/92 |
| 4,872,177 | 10/1989 | Baer et al. | 372/75 |
| 4,879,722 | 11/1989 | Dixon et al. | 372/21 |
| 4,879,723 | 11/1989 | Dixon et al. | 372/21 |
| 4,933,947 | 6/1990 | Anthon et al. | 372/34 |
| 4,942,582 | 7/1990 | Kintz et al. | 372/18 |
| 4,953,166 | 8/1990 | Mooradian | 372/21 |
| 4,982,405 | 1/1991 | Zayhowski | 372/10 |
| 5,022,745 | 6/1991 | Zayhowski et al. | 350/608 |
| 5,063,566 | 11/1991 | Dixon | 372/41 |
| 5,070,505 | 12/1991 | Dixon | 372/22 |
| 5,115,445 | 5/1992 | Mooradian | 372/75 |
| 5,164,947 | 11/1992 | Lukas | 372/22 |
| 5,222,088 | 6/1993 | Amano | 372/22 |
| 5,287,381 | 2/1994 | Hyuga et al. | 372/75 |
| 5,331,650 | 7/1994 | Maeda et al. | 372/26 |

FOREIGN PATENT DOCUMENTS

| | | | |
|---|---|---|---|
| 0455383 | 11/1991 | European Pat. Off. | H01S 3/109 |
| 4283977 | 10/1992 | Japan | H01S 3/094 |
| 4291976 | 10/1992 | Japan | H01S 3/109 |

OTHER PUBLICATIONS

Lu et al., Excited Emission and Self–Frequency–Doubling . . . ,Chinese Phys. Lett., vol. 3, No. 9, pp. 413–416 (1986) Date Not Available.

Wang et al., Characteristics of Neodymium . . . , Topical Mtng. on Advanced Lasers, Session TuB4, pp. 23–25 (1990) Date Not Available.

(List continued on next page.)

*Primary Examiner*—Leon Scott, Jr.
*Attorney, Agent, or Firm*—Lawrence A. Maxham; Baker, Maxham, Jester & Meador

[57] ABSTRACT

A monolithic diode pumped solid-state laser (11) comprising as the laser host neodymium-doped yttrium orthovanadate (Nd:YVO$_4$) (12, 52) or neodymium-doped gadolinium orthovanadate (Nd:GdVO$_4$) (57, 67) operating on the $^4F_{3/2} \rightarrow ^4I_{9/2}$ (~914 nm or ~912 nm respectively) transition, to which a suitable nonlinear optic material (16), such as potassium niobate (KNbO$_3$) or beta barium borate (BBO), is bonded. The nonlinear crystal gives rise to intracavity frequency doubling to ~457 or ~456 nm. The microlaser is a composite cavity formed from a gain medium crystal and a nonlinear frequency doubling material which together have four spaced parallel dielectrically coated faces (14, 17, 18, 15) and which is positioned in close proximity to a diode laser pump source (13) for phase-matched harmonic generation of blue light along an axis of propagation which lies substantially perpendicular to the two faces of the composite cavity. By employing specific doping concentration-lengths products of lasant material and pumping the gain medium which has a specific crystalline orientation the desired efficient blue microlaser is achieved. Alternative embodiments combine the Nd:YVO$_4$ and Nd:GdVO$_4$ elements to enhance certain output characteristics of the laser.

68 Claims, 3 Drawing Sheets

OTHER PUBLICATIONS

Schutz et al., Self–Frequency Doubling . . . , CLEO–90, paper CWC4 (1990) Date Not Available.

Lin, Progress Report: Diode Pumping and Frequency Conversion, Lasers & Optronics 8(7), pp. 61–66 (1989) Jul.

Byer, Diode Laser–Pumped Solid–State Lasers, Science, vol. 239, pp. 742–747 (1988) Feb.

Fan et al., Nd:MgO:LiNbO$_3$ Spectroscopy and Laser Devices, J. Opt. Soc. Am. B. vol. 3, No. 1, pp. 140–147 (1986) Jan.

Dimitriev et al., Simultaneous Emission . . . Lithium Metaniobate, Sov. Tech. Phys. Lett. vol. 5(11), p. 590 (1979) Nov.

Tatsuno et al., Highly Efficient . . . For Optical Storage, CLEO 92, Paper CWQ8 (May 1992).

Sasaki et al., Single–Longitudinal–Mode . . . Microchip Lasers, Optics Lett., vol. 16, No. 21, pp. 1665–1667 (1991) Nov.

Risk et al., Diode Laser Pumped . . . Nd:YAG Laser Appl. Phys. Lett., vol. 54, No. 17, pp. 1625–1627 (1989) Apr.

Yaney et al., Spectroscopic Studies . . . InYVO$_4$, J. Opt. Soc. Am., vol. 66, No. 12, pp. 1405–1414 (1976) Dec.

Zagumennyl et al., *The Nd:GdVO$_4$ Crystal: A New Material for Diode–Pumped Lasers,* Sov. J. Quan. Elect., pp. 1071–1072 (1992) (Date Not Available Ti Exm.).

Jensen et al., *Spectroscopic Characterization and Laser Performance of Diode–Laser–Pumped Nd:GdvO* App. Phys. B, pp. 373–379 (May 1994).

DEEP BLUE MICROLASER

CROSS REFERENCE TO RELATED APPLICATION

This is a continuation-in-part of application Ser. No. 08/112,558, filed 26 Aug. 1993, now abandoned.

BACKGROUND

1. Field of the Invention

This invention relates generally to lasers, and more specifically to diode-pumped solid-state blue microlasers which employ second harmonic generation.

2. Discussion of the Related Art

Many developments have been made concerning the generation of harmonic radiation from solid-state laser devices. These advances relate both to the efficiency with which such devices operate and to the output wavelengths which have been obtained. For applications requiring small-to-modest levels of optical power, an attractive form of solid-state laser has been that of the microlaser. Such a device comprises a monolithic or composite resonant cavity wherein a diode laser is used to pump a short element of solid-state gain medium, the latter being formed by reflective surfaces on opposite ends of the cavity.

The solid-state gain medium consists of a rare-earth ion, such as trivalent neodymium ($Nd^{3+}$), doped into a suitable host material. The most well studied gain medium is $Nd^{3+}$-doped yttrium aluminum garnet (Nd:YAG) which has been diode laser-pumped and has been made to lase at either 1342 nm, 1064 nm or 946 nm.

In Zayhowski, "Microchip Lasers," *The Lincoln Laboratory Journal*, Vol. 3, No. 3, pp. 427–445 (1990), the demonstration of single-frequency microchip lasers which use a miniature, monolithic, flat-flat, solid-state cavity whose longitudinal mode spacing is greater than the gain bandwidth of the gain medium, is reported. These microchip lasers are longitudinally pumped with the close-coupled, unfocused output of a laser diode to generate near-infrared radiation. Mooradian has disclosed in U.S. Pat. No. 4,860,304 a microlaser employing a gain medium made from Nd:YAG having a cavity length that is less than 700 μm.

Nonlinear optical crystals can be used to convert near-infrared radiation to the visible portion of the spectrum via second harmonic generation (SHG) (sometimes termed frequency doubling). This process generates a harmonic wavelength which is one-half of the fundamental wavelength. Since the SHG conversion efficiency is a function of the fundamental laser beam intensity, the nonlinear crystal is often placed inside the cavity of a low power continuous wave laser to benefit from the high intracavity fundamental beam intensity. This technique is well known and is discussed by Mooradian in U.S. Pat. No. 4,953,166 where a solid-state gain material is bonded to a SHG nonlinear crystal. Dielectric reflective coatings are deposited directly to the gain and nonlinear material surfaces to form a composite cavity intracavity doubled laser. However, the main intent of this reference is to teach configurations which give rise to single frequency operation by selecting the cavity length such that the gain bandwidth is less than or substantially equal to the frequency separation of the cavity modes. This is not the case with the present disclosure.

A typical SHG method is intracavity doubling using KTP (potassium-titanyl-phosphate, or $KTiOPO_4$) as a nonlinear crystal. Radiation at 532-nm with as much as a few watts of power has been obtained in this way with a longitudinally oriented, diode laser pumped Nd:YAG laser. Additionally, 4 mW at 473 nm has been achieved using $KNbO_3$ (potassium niobate) as an intracavity SHG crystal in combination with Nd:YAG lasing at 946 nm [Risk et al., Appl. Phys. Lett. 54 (17), 1625 (1989)]. However, diode laser pumped blue-green lasers based on intracavity SHG of Nd:YAG are limited in efficiency and stability due to the unpolarized emission, and the relatively weak, narrow diode absorption features of Nd:YAG. The conversion of optical radiation at one frequency into optical radiation of another frequency by integration with a nonlinear optical material within an optical cavity is known. Byer et al., in U.S. Pat. Nos. 4,739,507 and 4,731,787, disclose a diode-pumped laser having a harmonic generator. In U.S. Pat. No. 4,809,291, Byer describes a diode-pumped solid-state laser which is frequency doubled to produce blue light. Byer also discusses the same subject in the article "Diode Laser-Pumped Solid-State Lasers" *Science*, Vol. 239, p. 745 (1988). In these documents there is no mention of a requirement for polarized emission and/or broad absorption lines.

In contrast to the above mentioned blue-green solid-state lasers based on Nd:YAG, the uniaxial crystal $Nd:YVO_4$ (neodymium-doped yttrium orthovanadate) has polarized emission and strong, wide absorption transitions [Yaney et al., J. Opt. Soc. Am., 66, 1405 (1976)]. Diode laser pumped operation of $Nd:YVO_4$ lasing at 1064 nm with intracavity SHG to 532 nm utilizing KTP has been demonstrated to be more stable and efficient than Nd:YAG based systems [see Sasaki et al., Optics Letters, Vol, 16(21), 1665 (1991) and Tatsumo et al., "Highly Efficient and Stable Green Microlaser Consisting of $Nd:YVO_4$ with Intracavity KTP for Optical Storage," paper CWQS, *CLEO-92*, Anaheim, Calif. (May 1992)].

Kintz et al. in U.S. Pat. No. 4,942,582 disclose a technique for generating single frequency output from $Nd:YVO_4$ based lasers. Additionally, intracavity SHG utilizing KTP is claimed but no specific wavelengths or transitions are discussed. This patent specifically teaches the use of external, separate mirrors for the output coupler which does not correlate with the currently described invention.

Consequently, although in separate references the concept of intracavity doubled microlasers and of blue light production are recognized as practical, nowhere is there a teaching relative to blue microlasers which employ the $^4F_{3/2} \rightarrow {}^4I_{9/2}$ 914-nm emission line of $Nd:YVO_4$ to produce blue radiation at 457 nm via second harmonic generation in BBO or $KNbO_3$. Nor is there any recognition that low lasant ion concentrations, on the order of less than 2.0%, permit the efficient production of blue light to occur. Additionally, there is no requirement or suggestion in the known prior art for either polarized emission or broad absorption bands of the laser material.

SUMMARY OF THE INVENTION

A basic objective of the invention is to provide a miniaturized composite cavity blue microlaser which operates efficiently at room temperature. This objective is accomplished by a laser comprising an active gain medium comprising a rare earth doped microlaser crystal which has two opposite faces, said gain medium having a polarized emission at about 900 nm when optically pumped; a nonlinear frequency doubling crystal oriented to phase match at about 900 nm, said crystal having two opposite faces, said gain medium and doubling crystal being bonded together to form a composite cavity; and optical pumping means in operative relationship with said composite cavity for pumping said composite cavity in which frequency-doubling to the blue of its fundamental frequency occurs, the output of said composite cavity being polarized.

Specifically, the invention relates to a microlaser device which is based upon fundamental laser action on the $^4F_{3/2} \rightarrow {}^4I_{9/2}$ transition in Nd:YVO$_4$ (about 914 nm) or in Nd:GdVO$_4$ (neodymium-doped gadolinium orthovanadate at about 912 nm), or a combination of both, and second harmonic generation in BBO (beta barium borate) or KNbO$_3$ (potassium niobate) so as to provide a doubled output at about 457 nm or about 456 nm. Also, this microlaser device achieves a room-temperature Type-I phase match for the 914-nm line by employing a specifically oriented doubling crystal such as BBO or KNbO$_3$.

Important features of the invention include the novel use of the vanadates as the lasing crystals. Another aspect is that this is uniaxial crystal gain material with polarized emission, which provides better properties for frequency doubling. Additionally, the vanadate gain material has broad absorption bands, with attendant advantages for this invention.

Finally, the invention employs special dichroic coatings on the crystals. Specifically, these combine low reflectivity at 1064 nm and 1340 nm and high reflectivity at 914 nm on both external crystal faces. The crystal surface facing the diode laser pump has low reflectivity at 809 nm and high reflectivity at 457 nm for the Nd:YVO$_4$ embodiment.

As an alternative embodiment, when Nd:GdVO$_4$ is employed as the lasing crystal, its fundamental $^4F_{3/2} \rightarrow {}^4I_{9/2}$ lasing wavelength is about 912 nm and the doubled wavelength is about 456 nm. As a further alternative, a combination of Nd:YVO$_4$ and Nd:GdVO$_4$ are both used in a microlaser configuration where the Nd:YVO$_4$ is the lasing medium and the Nd:GdVO$_4$ acts as a spectral filter narrowing the effective linewidth of the $^4F_{3/2} \rightarrow {}^4I_{9/2}$ Nd:YVO$_4$ emission transition. This embodiment improves laser performance.

BRIEF DESCRIPTION OF THE DRAWING

The objects, advantages and features of this invention will be more clearly perceived from the following detailed description, when read in conjunction with the accompanying drawing, in which.

DETAILED DESCRIPTION OF THE PREFERRED EMBODIMENTS

While this invention is susceptible of having many different forms, described herein are specific exemplary embodiments of the invention.

Figure 1:
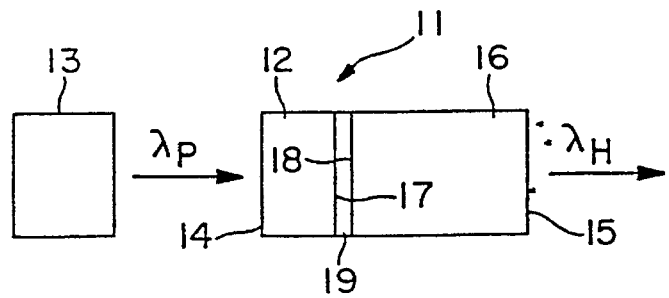
FIG. 1 is a schematic line diagram of the composite cavity intracavity doubled blue microlaser of this invention.

Referring now to the drawing, and more particularly to FIG. 1 thereof, laser 11 comprises gain medium 12 in the form of a thin etalon which is made from a rare earth doped crystal material. The etalon is bonded, such as by epoxy 19, to nonlinear crystal 16 to form a composite cavity. That cavity is optically pumped by source 13.

A highly suitable optical pumping source consists of at least one gallium aluminum arsenide (GaAlAs) laser diode which emits light having a wavelength of about 800 nm, preferably about 809 nm, and which is attached to a heat sink. The heat sink can be passive in character. However, the heat sink can also comprise a thermoelectric cooler or other temperature regulation means to help maintain the laser diode pumping source at a constant temperature and thereby ensure optimal operation of a laser diode at a constant wavelength. This is only an example of a suitable pumping source.

For efficient operation, the pumping radiation emitted by optical pumping means or source 13 is desirably matched with a suitable absorption band of the lasant material. In addition, the diode laser polarization is oriented with respect to the crystal axes of the laser medium for maximum absorption. The term "thin" as used herein means an etalon no more than 2 mm thick. The term "etalon" generally refers to a crystal with parallel faces. Since it is not necessary that the crystal faces be parallel in every embodiment, the term "crystal" will be used in some instances to refer to the element more broadly.

In the preferred embodiment of FIG. 1, gain material 12 is made from an etalon of neodymium-doped yttrium orthovanadate (Nd:YVO$_4$) and has two opposite, flat, parallel polished faces 14 and 17. It is oriented with respect to nonlinear crystal 16, having parallel polished faces 15 and 18, such that the propagation axis is phase-matched in BBO or KNbO$_3$ of blue light wavelength of ~457 nm. The distance between exterior faces 14 and 15 ranges between about 0.2 mm and 12 mm. At the present time, an element 12 would not likely function as desired if it were thinner than 0.1 mm. Frequency doubling crystal 16 would normally be about 0.1 to 11.9 mm long with the gain crystal being 0.1 to 2.0 mm between flat faces. It is advantageous that the laser of this invention employs separate crystals for lasing (gain material 12) and for wavelength conversion (doubling crystal 16).

Preferably, the output facet of semiconductor light source 13 is placed in butt-coupled relationship to input face 14 without the use of a focusing means or lens. As used herein, "butt-coupled" is defined to mean a coupling which is sufficiently close such that a divergent beam of optical pumping radiation emanating from semiconductor light source 13 will optically pump a mode volume within a lasant material with a sufficiently small transverse cross-sectional area so as to support essentially only single transverse mode laser operation (i.e., TEM$_{00}$ mode operation) in etalon 12. Optical pumping radiation is expected to be delivered to the lasant etalon in a direction which is substantially along a longitudinal optical path. The result is a miniature all-solid-state device having a blue output.

Alternatively, a focusing means or an imaging means can be used to image a laser diode array into gain material 22 which is coupled to nonlinear crystal 26, typically by means of epoxy 29. This embodiment is illustrated as laser 21 in FIG. 2. An imaging means, such as lens 27, serves to focus the output of a single stripe laser diode or diode array 23 into input face 24. This focusing results in high pumping intensity and an associated high photon-to-photon conversion efficiency in lasant material 22. The focusing means can comprise any conventional device such as a gradient index (i.e., GRIN) lens, a ball lens, an aspheric lens, or a combination of lenses.

Face 14 of etalon 12 may be referred to as the input face and is the face which is closest to source 13. Face 14 is coated with a dielectric for high reflection (HR) at ~914 nm and at ~457 nm. Opposite face 15 is coated with a dielectric for high reflection at ~914 nm, the fundamental wavelength, and for 1% to 20% anti-reflection (AR) at the harmonic wavelength of ~457 nm, so as to form an output coupler. Interior faces 17 and 18 are coated for anti-reflection at ~914 nm and ~457 nm. Since it is necessary that the higher gain emission of Nd:YVO$_4$ at 1064 nm and 1340 nm be suppressed so as not to compete with emission at 914 nm, it is essential that the coatings applied to surfaces 14 and 15 exhibit low reflectance at 1064 nm and 1340 nm. The terms "high" and "low" reflection relate to the specific values involved, as will be seen in Table 1 below. Wavelengths of 914 nm and 457 nm are shown to be highly reflected at faces 14, 24 and 34, for example, and to be much less reflected by faces 17, 27 and 41.

The input face of the etalon is also coated for high transmission (HT) at the pumping wavelength (about 809 nm) of source 13 to allow the pumping radiation to reach the lasant material which forms the etalon. Faces 24, 25, 27 and 28 in FIG. 2 are coated similarly.

Figure 2:
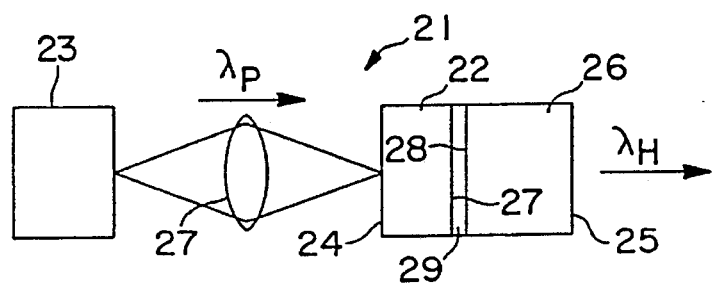
FIG. 2 is a schematic diagram of a composite cavity blue microlaser wherein pump radiation is coupled to the device through an intermediate focusing lens.

The embodiments of FIGS. 1 and 2 employ lasers 11,21 having separate gain elements (12,22) and frequency doubling media (16,26) bonded by materials 19, 29 to form monolithic structures.

Figure 3:
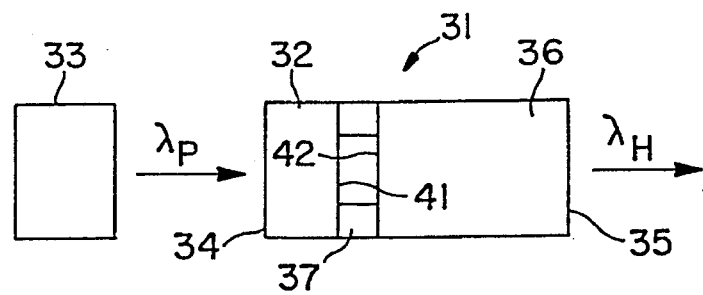
FIG. 3 is an alternative embodiment similar to FIG. 1 showing a dielectric spacer employed for coupling the two crystals together.

The FIG. 3 embodiment is structurally and functionally similar to those of FIGS. 1 and 2. Laser 31 includes the addition of dielectric spacer 37 between lasing medium crystal 32 and doubling crystal 36. As shown here, the spacer is annular in shape and creates a small air gap between the crystals. That air gap would normally be between 25 and 500 μm wide, and preferably would be 50–100 μm wide. Pumping source 33 and exterior end faces 34 and 35 operate the same as described for the other embodiments. Faces 41 and 42 are also coated and their functions are substantially the same as the interior faces described above with respect to the embodiments of FIGS. 1 and 2.

By way of further example, certain specifications are set forth here for enhanced understanding of the invention. They are meant to illuminate, and not to limit, the invention. The microlaser device would normally exhibit laser action on the $^4F_{3/2} \rightarrow {}^4I_{9/2}$ transition in Nd:YVO$_4$ (~914 nm), the frequency doubled output being ~457 nm. The doping concentration of neodymium in the crystal is low compared with the known prior art. The doping concentration ranges between 0.3 and 2.0%, depending upon the specific crystal lengths. The concentration—length product is chosen to maximize the efficiency of the blue laser device. This is an important point since the $^4F_{3/2} \rightarrow {}^4I_{9/2}$ transition is a quasi-three level system. The low doping concentration enables lasing to be achieved in the near infrared at ~914 nm. Also important is the crystal orientation. Both KNbO$_3$ and BBO achieve a room-temperature Type-I phase match for the 914-nm line by lasing polarized along the c-axis of the Nd:YVO$_4$ and orienting the nonlinear crystal such that it is polarized in the a–b plane and propagates at ~44° from the b-axis toward the a-axis for KNbO$_3$ and is polarized along the b-axis and propagates at ~25.7° from the c-axis to the a-axis for BBO.

The reflectivities of the crystal faces are also important. These range between 99.5% and 99.95%, the "high" end, for the 914-nm line for faces 14,24,34 and 15,25,35, and between 0 and 0.25%, the "low" end, for faces 17,18,27, 28,41 and 42. The reflectivities for 1064 nm and 1340 nm range between about 10% and 50%, which are "low" for these wavelengths. In this case, "about" means the low end is less than 10% and the upper end is less than 50%. This reflectivity arrangement enables the low pumping threshold and prevents lasing of the 1064 nm and the 1340 nm transitions.

More specifically, Table 1 below gives the reflectivities in percentages for each of the coated faces by wavelength.

TABLE 1

| | REFLECTIVITIES | | | |
|---|---|---|---|---|
| Wavelength | Faces 14,24,34 | Faces 15,25,35 | Faces 17,27,41 | Faces 18,28,42 |
| 809 | <5 | | | |
| 914 | ≥99.9 | ≥99.9 | ≤0.25 | ≤0.25 |
| 1064 | <10 | | <10 | |
| 1340 | <50 | | <50 | |
| 457 | >99 | 1–20 | ≤1 | ≤1 |

Figure 4:
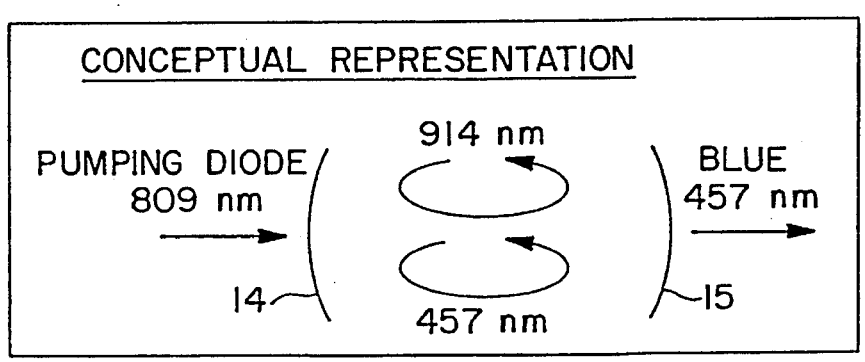
FIG. 4 shows a conceptual representation of the lasing action within the composite crystal cavity.
Figure 5:
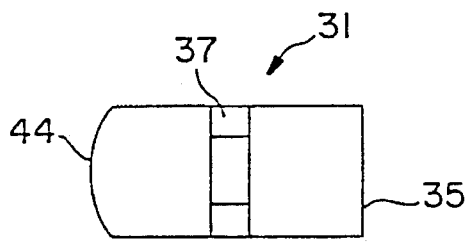
FIG. 5 is an alternative embodiment of FIG. 3 showing a convex input face.
Figure 6:
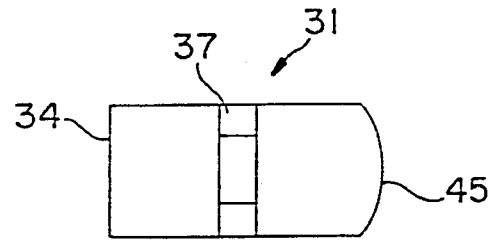
FIG. 6 is an alternative embodiment of FIG. 3 showing a convex output face.

From these values, and from FIGS. 1–3, the Conceptual Representation of FIG. 4 can be easily understood. The pumping diode light at 809 nm enters at face 14, causes lasing at ~914 nm within the composite cavity between faces 14 and 15. The intracavity nonlinear crystal gives rise to frequency doubling to ~457 nm which, because of the low reflectivity of face 15 for the blue light (which can be as low as 1% to as high as 20%) is transmitted from the composite cavity as useful blue laser light.

As mentioned above in the Summary, Nd:YVO$_4$ may be replaced by Nd:GdVO$_4$ as lasing crystal gain medium 12 in FIG. 1. It may be similarly substituted for the equivalent element in FIGS. 2–6. The specific differences are reflected in the applicable wavelengths. The Nd:GdVO$_4$ element has a fundamental wavelength of ~912 nm, a doubled wavelength of ~456 nm, and the suppressed wavelength is ~1062 nm. These are the only changes that would be required in Table 1 to make it applicable to the Nd:GdVO$_4$ embodiment.

An interesting and useful further alternative is a blue microlaser which combines Nd:YVO$_4$ and Nd:GdVO$_4$ elements with the appropriate nonlinear crystal such that the microlaser is formed by three elements. Possible embodiments of this alternative are the structures shown in FIGS. 7 and 8.

Figure 7:
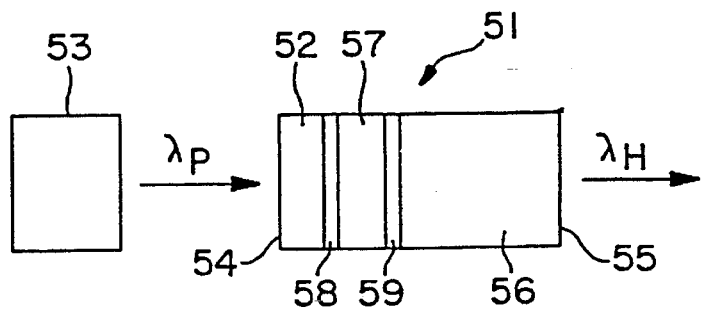
FIG. 7 is an alternative embodiment of FIG. 1 showing the use of two laser materials operating together, one acting as the laser material and the second operating as a spectral filter.

The relative reference numerals used in FIGS. 1–3 have been continued in these figures. In FIG. 7 laser 51 comprises gain medium 52, preferably Nd:YVO$_4$. The cavity is optically pumped by source 53. The nonlinear crystal is element 56. However, in this embodiment, etalon 52 is bonded to etalon 57, the Nd:GdVO$_4$ element, by suitable bonding means 58. This composite gain medium is bonded to crystal 56 by bonding means 59.

Figure 8:
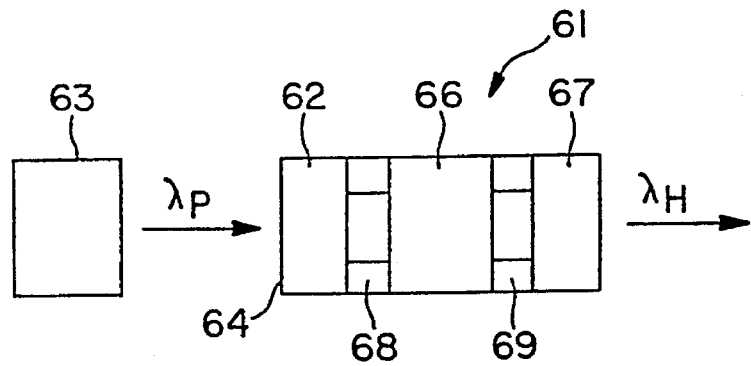
FIG. 8 is an alternative embodiment of FIG. 7 with a different placement of the second crystal.

Similarly, in FIG. 8, gain medium 62 of laser 61 is pumped by source 63 and is appropriately secured to crystal 66 through dielectric spacer 68. At the other end of crystal 66 is another spacer 69 to which is connected Nd:GdVO$_4$ element 67. Any face securing means, as previously discussed, may be employed.

Due to the relatively broad $^4F_{3/2} \rightarrow ^4I_{9/2}$ emission centered at ~914 nm in Nd:YVO$_4$ with a full width at half maximum (FWHM) emission bandwidth of ~3.5 nm it is often difficult to obtain narrow linewidth laser emission and/or single longitudinal mode operation. Ideally a narrow bandwidth spectral filter could be used inside the laser cavity to effectively narrow the emission bandwidth. Glass etalons are often used but they tend to be difficult to implement. Here we disclose the use of an intracavity Nd:GdVO$_4$ element as a spectral filter for the Nd:YVO$_4$ laser. This is possible since the Nd:GdVO$_4$ $^4F_{3/2} \rightarrow ^4I_{9/2}$ absorption transition is shifted by about 2 nm relative to the Nd:YVO$_4$ emission transition and is centered at about 912 nm with a FWHM of about 2.8 nm. Thus when the Nd:GdVO$_4$ is placed inside a Nd:YVO$_4$ laser cavity the short wavelength portion of the Nd:YVO$_4$ $^4F_{3/2} \rightarrow ^4I_{9/2}$ 914 nm emission is absorbed by the Nd:GdVO$_4$ which gives rise to a narrowing of the emission bandwidth. By specifying the neodymium concentration in the Nd:GdVO$_4$, the absorption of the spectral filter can be optimized for laser performance. The narrowing of the net emission bandwidth allows for a more efficient SHG process in the nonlinear crystal due to the finite spectral acceptance of the nonlinear crystal.

Figure 9A:
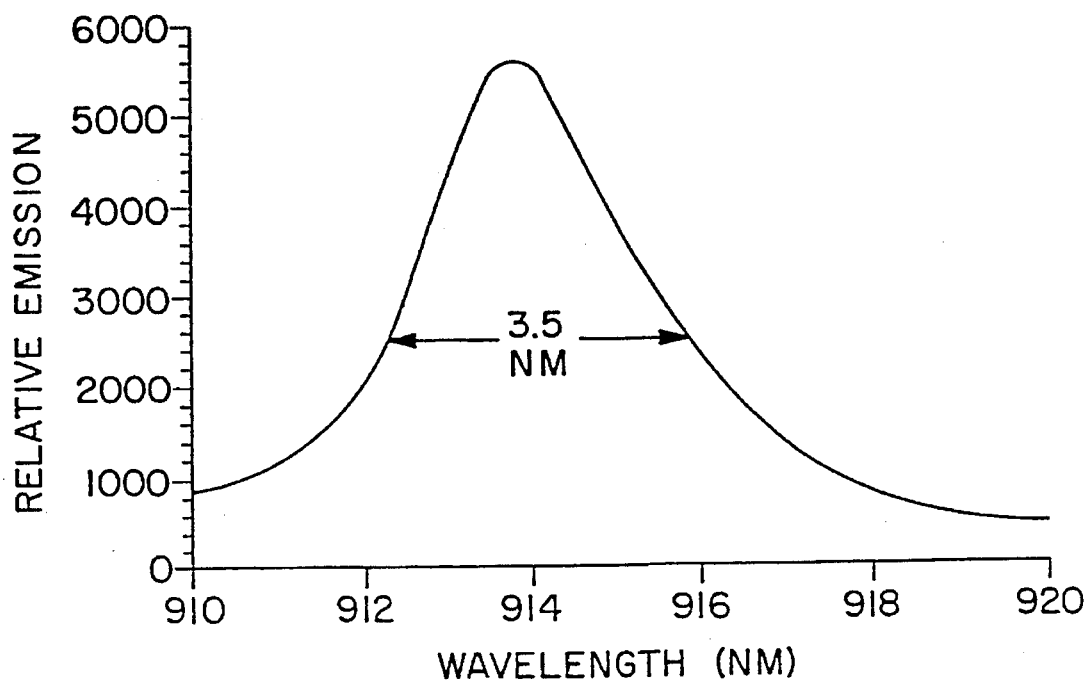
FIG. 9A represents the $^4F_{3/2} \rightarrow {}^4I_{9/2}$ emission spectrum of a Nd:YVO$_4$ crystal.
Figure 9B:
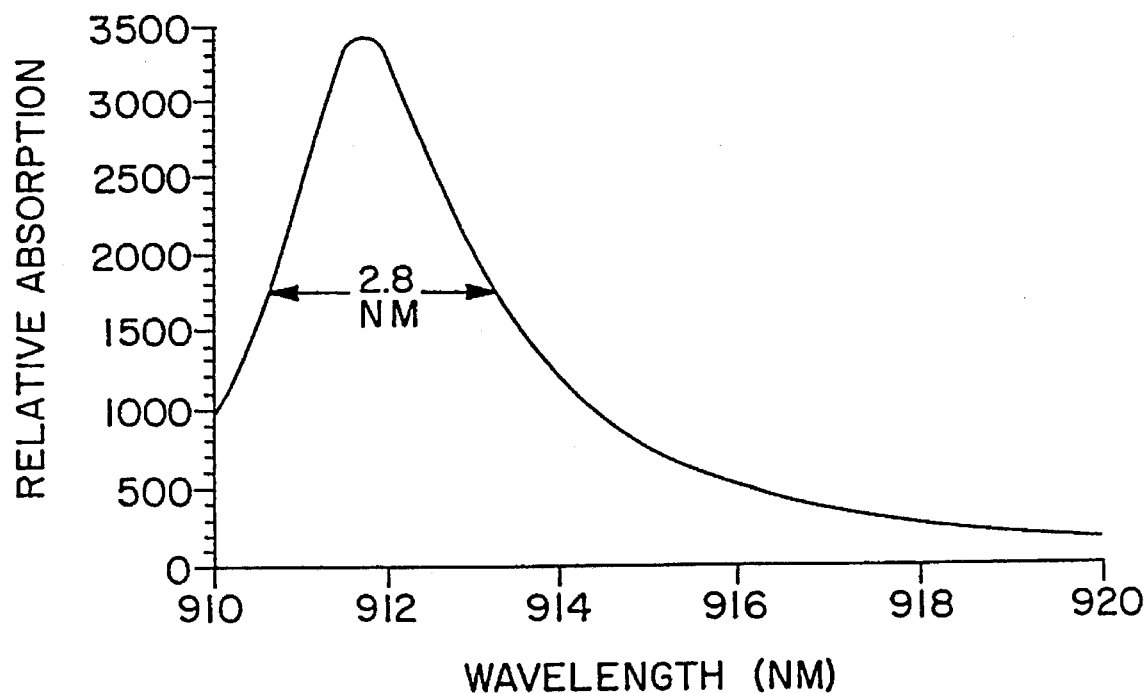
FIG. 9B represents the $^4F_{3/2} \rightarrow {}^4I_{9/2}$ absorption spectrum of a Nd:GdVO$_4$ crystal.
Figure 9C:
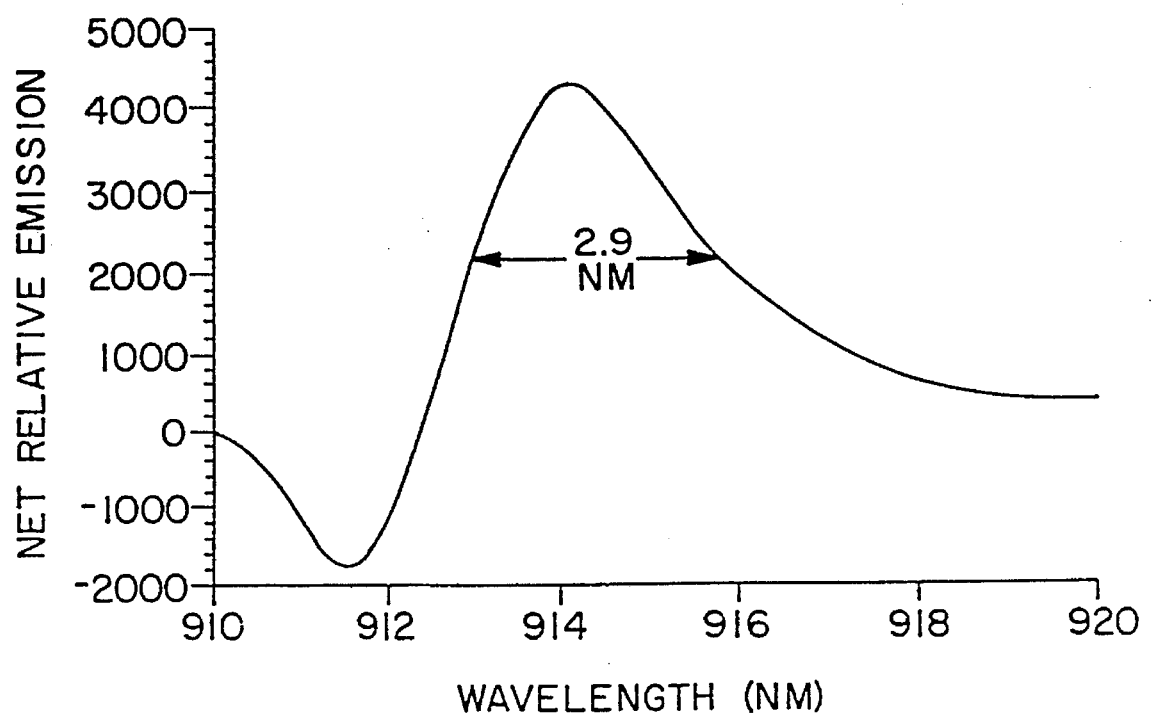
FIG. 9C is the net $^4F_{3/2} \rightarrow {}^4I_{9/2}$ emission spectrum when the crystals of FIGS. 9A and 9B are employed together in the FIG. 7 or FIG. 8 embodiments.

The above composite cavity discussion is illustrated in FIGS. 9A, 9B and 9C. FIG. 9A shows the $^4F_{3/2} \rightarrow ^4I_{9/2}$ emission transition at ~914 nm of the Nd:YVO$_4$ element 52, 62 in FIGS. 7 and 8, respectively. The $^4F_{3/2} \rightarrow ^4I_{9/2}$ absorption transition at ~912 nm of the Nd:GdVO$_4$ element 57, 67 is depicted in FIG. 9B. The resulting net $^4F_{3/2} \rightarrow ^4I_{9/2}$ emission of Nd:YVO$_4$ with intracavity Nd:GdVO$_4$ is shown in FIG. 9C. The 914 nm emission is shown as a narrowed peak.

As a general matter the gain and spectral filter crystals are preferably less than 2 mm thick. The nonlinear frequency doubling crystal would typically be less than ~10 mm long from face 18,28,42 to output face 15,25,35. The same is true for crystals 56 and 66 in FIGS. 7 and 8.

While the preferred embodiment calls for both external end faces 14 and 15 to be flat and parallel, that is not necessary for functioning of the invention. The input face may be convex, as is face 44 in FIG. 5. The output face 45 (FIG. 6) could be convex. Either face could alternatively be concave. In either case the radius of curvature is greater than the distances between the faces of the etalon.

There are several features of the invention which are of significance. One is the use of vanadate to produce blue light in a thin crystal microlaser. Another is that the gain medium is made of uniaxial crystal having polarized emission, providing better properties for frequency doubling. Still another important feature is that the output of the composite cavity is polarized. Other operational advantages arise from the fact that the gain medium has strong broad absorption bands, more than 2 nm FWHM. By way of contrast, a Nd:YAG crystal has narrow absorption bands, less than 1.5 nm FWHM.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and separate features of the invention may be utilized. For example, the precise geometric shape of lasant material 12 can be varied-crystal 12 can be circular or rectangular in shape. If desired, the gain crystal can be end-pumped by an optical fiber. The bonding of one crystal to another can be by optical contact, diffusion bonding, or by use of index matching fluid optical epoxies, among others. The drawing figures are schematic only, intended to show element relationships, but not to depict specific sizes and shapes. Thus, it will be appreciated that various modifications, alternatives, and variations may be made without departing from the spirit and scope of the invention as defined in the appended claims. It is, of course, intended to cover by the appended claims all such modifications involved within the scope of the claims.

What is claimed is:

1. A laser comprising:

an active gain medium comprising a rare earth doped microlaser crystal selected from the group consisting of neodymium-doped yttrium orthovanadate (Nd:YVO$_4$) and neodymium-doped gadolinium orthovanadate (Nd:GdVO$_4$), said gain medium having two opposite faces, one said face being an input face, said gain medium having a polarized emission at the fundamental wavelength of about 912–914 nm when optically pumped;

a nonlinear frequency doubling crystal oriented to phase match at about 912–914 nm, thereby defining the polarization orientation and the propagation axis relative to said nonlinear crystal, said nonlinear crystal having two opposite faces, said gain medium and nonlinear crystal being bonded together to form a composite resonant cavity having a propagation axis, said non linear crystal face located opposite to its said face adjacent said gain medium being the output face of said laser;

the distance between said input and output faces ranging between about 0.2 mm and 12 mm, the doping concentration of said gain medium ranging between 0.3 and 2.0%; and optical pumping means in effective operative relationship with said gain medium, for pumping said gain medium, frequency-doubling occurring in said composite cavity to generate blue light from the fundamental frequency of said gain medium at about 456–457 nm, said gain medium exhibiting laser action at the $^4F_{3/2} \rightarrow ^4I_{9/2}$ 914-nm transition when said gain medium is pumped by said optical pumping means.

2. The laser recited in claim 1, wherein said gain medium crystal is a thin etalon.

3. The laser recited in claim 1, wherein said gain medium is characterized by having broad absorption bands.

4. The laser recited in claim 1, wherein said gain medium crystal and said frequency doubling crystal are bonded together with epoxy.

5. The laser recited in claim 1, and further comprising a dielectric spacer between said gain medium crystal and said frequency doubling crystal.

6. The laser recited in claim 5, wherein said spacer is annular in shape and said dielectric is air.

7. The laser recited in claim 1, wherein said gain medium crystal etalon has a thickness between said faces ranging between about 0.1 and 2.0 mm mm in length.

8. The laser recited in claim 1, wherein said gain medium crystal is no more than 2 mm between said faces.

9. The laser recited in claim 1, wherein said gain medium crystal ranges between 0.1 and 0.6 mm between said faces.

10. The laser recited in claim 1, wherein said gain medium crystal is made from an etalon of neodymium-doped yttrium orthovanadate (Nd:YVO$_4$) bonded to said nonlinear frequency doubling crystal to form said composite cavity having said input and output faces which are external, opposite, flat, parallel, and polished and which are perpendicular to the propagation axis for phase-matched generation of blue light wavelength of about 457 nm.

11. The laser recited in claim 10, and further comprising:
 a dielectric coating on said input face which is highly reflective at the blue light wavelength; and
 a dielectric coating on said output face which is highly reflective at the fundamental wavelength from which the blue light is generated and said output face is partially transmissive at the blue light wavelength.

12. The laser recited in claim 11, wherein said output face dielectric coating is 99–80% transmissive of the blue wavelength.

13. The laser recited in claim 11, wherein said dielectric coatings on both said input and output faces have a low reflectance at 1064 nm, a high gain emission of Nd:YVO$_4$.

14. The laser recited in claim 11, wherein said dielectric coating on both said input and output external faces have a high reflectivity at the fundamental wavelength of ~914 nm.

15. The laser recited in claim 11, wherein said input face coating has high transmissivity at the pumping wavelength from said optical pumping source.

16. The laser recited in claim 1, wherein said gain medium crystal is made from an etalon of neodymium-doped gadolinium orthovanadate (Nd:GdVO$_4$) bonded to said nonlinear frequency doubling crystal to form said composite cavity having said input and output faces which are external, opposite, flat, parallel, and polished and which are perpendicular to the propagation axis for phase-matched generation of blue light wavelength of about 456 nm.

17. The laser recited in claim 1, wherein said optical pumping means is closely coupled to said gain medium.

18. The laser recited in claim 17, wherein the output light from said optical pumping means is incident onto said gain medium.

19. The laser recited in claim 1, wherein said optical pumping means is butt-coupled to said gain medium.

20. The laser recited in claim 1, and further comprising optical imaging means, wherein said optical pumping means is spaced from said gain medium, the output light from said optical pumping means being optically imaged onto said gain medium by said optical imaging means.

21. The laser recited in claim 1, wherein said frequency doubling crystal is oriented with respect to the polarized emission from said gain medium to produce Type-I harmonic generation.

22. The laser recited in claim 21, wherein said frequency doubling crystal is KNbO$_3$ and wherein said microlaser achieves a Type-I phase match for the fundamental 914-nm wavelength by lasing polarized along the c-axis of said gain medium and orienting the fundamental wavelength that it is polarized in the a–b plane and propagates at ~44° from the b-axis toward the a-axis of said frequency doubling crystal.

23. The laser recited in claim 22, wherein said output face has a radius of curvature which is greater than the distance between said input and output faces.

24. The laser recited in claim 21, wherein said frequency doubling crystal is BBO and wherein said microlaser achieves a Type-I phase match for the fundamental 914-nm wavelength by lasing polarized along the c-axis of said gain medium and orienting the fundamental wavelength such that it is polarized along the b-axis and propagates at ~25.7° from the c-axis toward the a-axis of said frequency doubling crystal.

25. The laser recited in claim 1, wherein said composite cavity is formed with said input face adjacent said optical pumping means being flat, said output face being curved.

26. The laser recited in claim 1, wherein said optical pumping means is close-coupled with said gain medium and emits at a near-infrared wavelength which is strongly absorbed by said gain medium.

27. The laser recited in claim 26, wherein said optical pumping means is selected from the group consisting of laser diodes and laser diode arrays.

28. The laser recited in claim 27, wherein said optical pumping means comprises at least one gallium aluminum arsenide (GaAlAs) laser diode which emits light at a wavelength of about 809 nm and which is attached to a heat sink.

29. A laser recited in claim 1, wherein said composite cavity is formed with said input face adjacent said optical pumping means being curved, said output face being flat.

30. The laser recited in claim 1, wherein said gain medium crystal is a uniaxial crystal having polarized emission.

31. The laser recited in claim 1, and further comprising a spectral filter crystal which, when combined with said gain medium crystal, narrows the effective spectral width of the $^4F_{3/2} \rightarrow {}^4I_{9/2}$ 914 nm transition of said laser output.

32. The laser recited in claim 31, wherein said spectral filter crystal is bonded between said gain medium and said frequency doubling crystal.

33. The laser recited in claim 31, wherein said spectral filter is bonded to the face of said frequency doubling crystal opposite to said gain medium.

34. The laser recited in claim 31, wherein said spectral filter crystal is formed of neodymium-doped gadolinium orthovanadate (Nd:GdVO$_4$), having an absorption wavelength of ~912 nm.

35. A laser comprising:
 an active gain medium microlaser comprising a neodymium-doped yttrium orthovanadate (Nd:YVO$_4$) thin crystal material having a propagation axis, an input face and an opposite face, said gain medium exhibiting laser action at the $^4F_{3/2} \rightarrow {}^4I_{9/2}$ 914 nm transition to provide a polarized emission at about 914 nm;
 a nonlinear frequency doubling crystal having an output face and an opposite face, said opposite face of said gain medium being bonded to said opposite face of said doubling crystal to form a composite resonant cavity;
 the distance between said input and output faces ranging between about 0.2 mm and 12 mm, the doping concentration of said gain medium ranging between 0.3 and 2.0%; and
 optical pumping means in effective operative relationship with said gain medium to pump with polarized light said gain medium to thereby excite said gain medium to emit at its fundamental wavelength of ~914 nm which is doubled within said composite cavity to produce blue light output at ~457 nm, said gain medium having a crystalline structure having a predetermined orientation with respect to the polarization of the optical pumping light applied to said gain medium.

36. The laser recited in claim 35, wherein fundamental laser action on the $^4F_{3/2} \rightarrow {}^4I_{9/2}$ 914 nm transition in Nd:YVO$_4$ is such as to provide the 457 nm output.

37. The laser recited in claim 35, wherein the neodymium doping concentration is about 1.5%.

38. The laser recited in claim 35, wherein said frequency doubling crystal is oriented with respect to the polarized emission from said gain medium to produce room temperature Type-I harmonic generation.

39. The laser recited in claim 38, wherein said frequency doubling crystal is KNbO$_3$ and wherein said microlaser achieves a Type-I phase match for the fundamental 914-nm wavelength by lasing polarized along the c-axis of said gain medium and orienting the fundamental wavelength such that it is polarized in the a–b plane and propagates at ~44° from the b-axis toward the a-axis of said frequency doubling crystal.

40. The laser recited in claim 38, wherein said frequency doubling crystal is BBO and wherein said microlaser achieves a Type-I phase match for the fundamental 914-nm wavelength by lasing polarized along the c-axis of said gain medium and orienting the fundamental wavelength such that it is polarized along the b-axis and propagates at ~25.7° from the c-axis toward the a-axis of said frequency doubling crystal.

41. The laser recited in claim 35, wherein said composite cavity is formed with said input and output faces which are exterior, opposite, flat, parallel and polished which are perpendicular to said propagation axis for phase matched generation of the blue light, said microlaser further comprising:

a dielectric coating on said input face adjacent said optical pumping means which is highly reflective at ~457 nm and at the fundamental wavelength of ~914 nm; and a dielectric coating on said output face which is highly reflective at the fundamental wavelength and is partially transmissive at the blue light wavelength.

42. The laser recited in claim 41, wherein said second face dielectric coating is 99–80% transmissive to the blue light wavelength.

43. The laser recited in claim 41, wherein said input face dielectric coating is highly transmissive at the pumping wavelength.

44. The laser recited in claim 35, wherein said optical pumping means is closely coupled to said gain medium.

45. The laser recited in claim 44, and further comprising imaging means mounted between said crystal and said optical pumping means.

46. The laser recited in claim 35, wherein said optical pumping means is butt-coupled to said gain medium.

47. The laser recited in claim 35, wherein said composite cavity is formed with said input face adjacent said optical pumping means being flat, said opposite face being curved.

48. The laser recited in claim 35, wherein said optical pumping means produces optical radiation at about 809 nm, said gain medium has a neodymium doping concentration of about 1.5%, said frequency doubling crystal is KNbO$_3$, said microlaser exhibiting a room-temperature Type-I phase match for the 914-nm wavelength by lasing polarized along the c-axis of said gain medium and orienting the fundamental wavelength such that it is polarized in the a–b plane and propagates at ~44° from the b-axis toward the a-axis of said frequency doubling crystal.

49. The laser recited in claim 35, wherein said optical pumping means produces optical radiation at about 809 nm, said gain medium has a neodymium doping concentration of about 1.5%, said frequency doubling crystal is BBO, said microlaser exhibiting a room-temperature Type-I phase match for the 914-nm wavelength by lasing polarized along the c-axis of said gain medium and orienting the fundamental wavelength such that it is polarized along the b-axis and propagates at ~25.7° from the c-axis toward the a-axis of said frequency doubling crystal.

50. The laser recited in claim 35, wherein said composite cavity is formed with said input and output faces having dichroic coatings thereon, said coatings on both faces having low reflectivity at 1064 nm and 1340 nm, said input face being adjacent said optical pumping means.

51. The laser recited in claim 35, wherein said gain medium is characterized by having broad absorption bands.

52. The laser recited in claim 35, wherein said gain medium crystal and said frequency doubling crystal are bonded together with epoxy.

53. The laser recited in claim 35, wherein the output of said composite cavity is polarized.

54. The laser recited in claim 35, wherein said gain medium is a uniaxial crystal having polarized emission.

55. The laser recited in claim 35, and further comprising a spectral filter crystal which, when combined with said gain medium crystal, narrows the effective spectral width of the $^4F_{3/2} \rightarrow ^4I_{9/2}$ 914 nm transition of said laser output.

56. The laser recited in claim 55, wherein said spectral filter crystal is bonded between said gain medium and said frequency doubling crystal.

57. The laser recited in claim 55, wherein said spectral filter is bonded to the face of said frequency doubling crystal opposite to said gain medium.

58. The laser recited in claim 55, wherein said spectral filter crystal is formed of neodymium-doped gadolinium orthovanadate (Nd:GdVO$_4$), having an absorption wavelength of ~912 nm.

59. A laser comprising:

an active gain medium microlaser comprising a neodymium-doped gadolinium orthovanadate (Nd:GdVO$_4$) thin crystal material having a propagation axis, an input face and an opposite face, said gain medium exhibiting laser action at the $^4F_{3/2} \rightarrow ^4I_{9/2}$ 914 nm transition to provide a polarized emission at about 914 nm;

a nonlinear frequency doubling crystal having an output face and an opposite face, said gain medium being bonded to one said face of said doubling crystal to form a composite resonant cavity;

the distance between said input and output faces ranging between about 0.2 mm and 12 mm, the doping concentration of said gain medium ranging between 0.3 and 2.0%; and optical pumping means in effective operative relationship with said gain medium to pump with polarized light said gain medium to thereby excite said gain medium to emit at its fundamental wavelength of ~912 nm which is doubled within said composite cavity to produce blue light output at ~456 nm, said gain medium having a crystalline structure having a predetermined orientation with respect to the optical pumping energy applied to said gain crystal by said gain medium.

60. A method for producing blue light by means of a microlaser, said method comprising the steps of:

selecting an active gain medium comprising a neodymium-doped rare earth microlaser crystal having two opposite faces, the gain medium displaying strong broad diode absorption bands and polarized emission at ~914 nm;

selecting a nonlinear frequency doubling crystal oriented to phase match at ~914 nm, the frequency doubling crystal having two opposite faces;

bonding together in facing relationship the gain medium crystal and the frequency doubling crystal to form a composite resonant cavity; and optically pumping the gain medium with polarized light energy at a frequency to cause lasing to occur and doubling to the blue within the composite cavity, the output of the composite cavity being polarized blue laser light.

61. The method recited in claim 60, wherein the gain medium is a crystal producing a blue light output from the composite cavity and is selected from the group consisting of neodymium-doped yttrium orthovanadate (Nd:YVO$_4$) and neodymium-doped gadolinium orthovandate (Nd:GdVO$_4$).

62. The method recited in claim 61, wherein the gain medium crystal is a uniaxial crystal having polarized emission.

63. The method recited in claim 60, wherein the microlaser operates at room temperature.

64. The method recited in claim 60, wherein the gain medium emits light at ~914 nm which is doubled to the blue at ~457 nm.

65. The method recited in claim 60, wherein the gain medium emits light at ~912 nm which is doubled to the blue at ~456 nm.

66. The method recited in claim 60, and comprising the further steps of:

selecting a spectral filter crystal comprising a neodymium-doped rare earth crystal;

bonding the spectral filter crystal to one face of the frequency doubling crystal, the combined effect of the active gain medium, spectral filter crystal and frequency doubling crystal being to narrow the effective output wavelength of the microlaser.

67. The method recited in claim 60, wherein said spectral filter crystal is bonded between said gain medium and said frequency doubling crystal.

68. The laser recited in claim 60, wherein said spectral filter is bonded to the face of said frequency doubling crystal opposite to said gain medium.

* * * * *